United States Patent [19]

Sivley

[11] 3,883,794
[45] May 13, 1975

[54] ELECTRICAL POWER GENERATING APPARATUS

[75] Inventor: Theodore Edward Sivley, Mountain View, Calif.

[73] Assignee: Whamco, Mtn. View, Calif.

[22] Filed: Dec. 26, 1972

[21] Appl. No.: 317,922

[52] U.S. Cl. ............... 322/41; 180/53; 290/1.4; 322/1
[51] Int. Cl. ............... B60k 17/28; H02p 15/00
[58] Field of Search ............... 64/4, 6, 27 NM, 30 D; 310/83, 84, 78, 91, 75 D; 74/15.6, 15.69, 841, 842; 123/198; 180/53; 322/40–43

[56] References Cited
UNITED STATES PATENTS

| | | | |
|---|---|---|---|
| 1,190,496 | 7/1916 | Whitney | 310/78 X |
| 1,214,967 | 2/1917 | Sperry | 290/1 C |
| 1,904,745 | 4/1933 | Nowosielski | 310/75 D X |
| 2,612,249 | 9/1952 | Horn | 290/1 C X |
| 2,870,616 | 1/1959 | Benson | 64/27 NM |
| 3,080,735 | 3/1963 | Blom, Jr. et al. | 64/27 NM X |

*Primary Examiner*—James D. Trammell
*Assistant Examiner*—Robert J. Hickey

[57] ABSTRACT

A power takeoff alternator assembly is provided for use as a main source of continuous electrical energy for battery charging and other electrical equipment requirements during the normal operation of trucks, buses, tractors and other commercial vehicles. The assembly comprises a housing in which a power takeoff unit and an alternator are rigidly mounted in axial alignment and mechanically coupled by means of a keyed flexible dynamic coupling. The housing is specially adapted for mounting the assembly as a unitary package to any standard transmission designed to receive a conventional power takeoff unit.

4 Claims, 6 Drawing Figures

3,883,794

ELECTRICAL POWER GENERATING APPARATUS

BACKGROUND OF THE INVENTION

Alternators for providing continuous electrical energy for battery charging and other electrical requirements during normal truck, bus and other commercial vehicle operation are typically mounted in the vehicle engine compartment and belt driven. Due to the difficult and frequent improper installation of the alternators and adjustment of the belts occasioned by repair or replacement and misaligned mounting brackets, the forward bearing of the alternators is often subjected to severe side loading resulting in premature bearing and hence, alternator failure.

The expense of alternator failures to freight lines, for example, is not attributed principally to the labor and cost of repair or replacing alternators, through that is not an insignificant factor, but rather, to the delays in transit and the costs associated with the picking up of disasbled trucks from along the highways. Alternator failures as well as reduced electrical output are also attributed to the very high temperature levels extant in the engine compartments.

The problem of premature alternator failures is well recognized by both the trucking industry and the suppliers of alternators. Operators of large tractor trailer units, such as dual van type, typically average 15,000 miles per month. Such extensive use is to be compared with the typical guarantee available from leading suppliers of alternators of only 24,000 miles, or in other words, approximately one and one half months of operation per truck. The mean failure rate of alternators in the industry appears to be between 40,000 and 50,000 miles.

Efforts which have been made to relieve the load on alternators include the utilization of air starters to reduce battery drain, however, neither this prior known method or any other has significantly increased alternator life.

Power take off units (PTO) are conventionally mounted to engines and transmissions and are typically used as an auxiliary power transfer device for driving accessory equipment such as, for example, winches, drilling rigs, refrigeration machines, compressors, etc. They are not generally used as a continuous power transfer device and are typically rated only for intermittant service because of the severe mechanically loading to which they are subjected due to engine and transmission vibration as high as 10–12 g's and more in some trucks.

It is therefore, particularly desirable to have available a method and means for extending the operating life of alternators and power take off units and to provide for continuous service using such devices while at the same time achieving higher power output levels than heretofore obtained with the same or similar equipment.

SUMMARY OF THE INVENTION

A principal object of the present invention is, therefore, an improved source of electrical energy and in particular, a power takeoff alternator assembly for providing continuous electrical power during normal operation of a vehicle.

A feature of the present invention is an assembly in which an alternator is coupled to a transmission and driven continuously by means of an intermediate power takeoff unit and flexible dynamic coupling.

A feature of the assembly is a housing within which the power takeoff unit and alternator are rigidly mounted.

A feature of the housing is a means for mounting the assembly as a unit to any conventional transmission designed to receive a conventional power takeoff unit.

A further feature of the assembly is a flexible dynamic coupling adapted to slip under a predetermined load so as to prevent premature destruction of the power takeoff unit should the alternator become mechanically inoperative and premataure failure of the alternator should it become misaligned with the power takeoff unit.

Principal advantages of the assembly of the present invention are that it is rugged and uncomplicated. It is quickly installed and removed and requires no adjustments. Both alternataor and power takeoff operating life are doubled.

Tests have revealed 10 such assembly have already exceeded 100,000 miles of use without a failure as compared with the average life of 40–50,000 miles for alternators in conventional uses.

DESCRIPTION OF THE DRAWINGS

The above objects, features and advantages of the present invention and others will be apparent from the following detailed description of the accompanying drawings in which.

DETAILED DESCRIPTION

Figure 1:
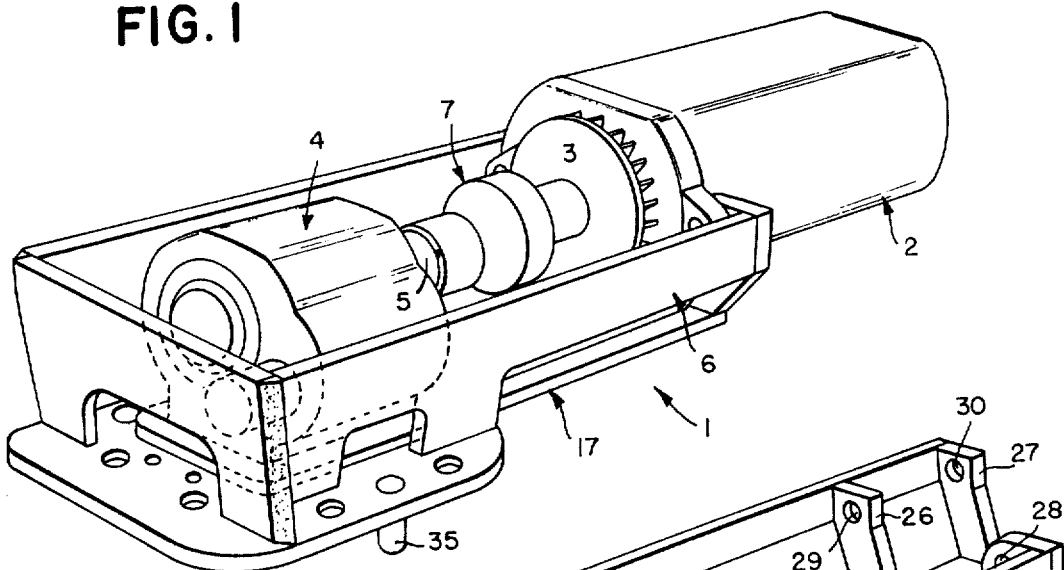
FIG. 1 is a prospective view of the power takeoff alternator assembly of the present invention.

Referring to FIG. 1, there is provided in accordance with the present invention a power takeoff alternator assembly 1 suitable for mounting as a unitary package directly to the transmission of any vehicle adapted to receive a conventional power takeoff unit for producing electrical energy during normal operation of the vehicle. Such vehicles may, for example, comprise tractors, buses and trucks. Use of the assembly in trucks such as those operated by freight lines is particularly advantageous in that it significantly increases the mean time between alternator failures now experienced by freight lines by as much as 100 percent.

Assembly 1 essentially comprises four principal elements, a source of electrical energy, such as, an alternator 2, having an input shaft 3, a mechanical power transfer device, such as a power takeoff unit 4, having an output shaft 5, a relatively rigid housing 6 and a flexible dynamic coupling 7.

Figure 2:
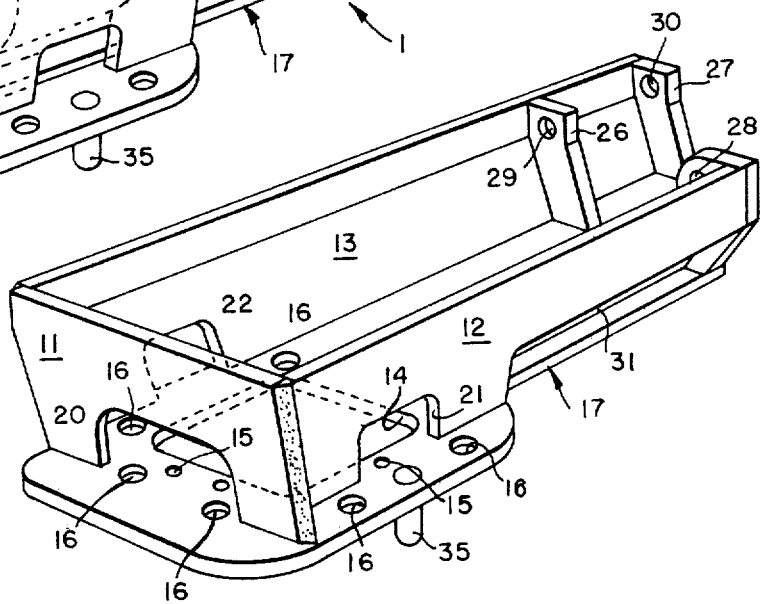
FIG. 2 is a prospective view of the housing of FIG. 1 with the power takeoff and alternator units removed for clarity of illustration.
Figure 3:
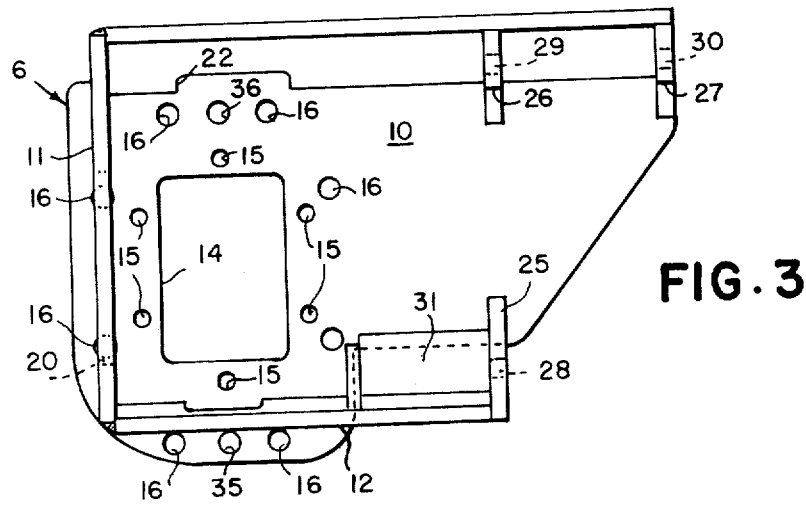
FIG. 3 is a plan view of the housing of FIG. 2.

Referring to FIGS. 2 and 3, housing 6 is provided with a base plate 10 and three sidewalls 11, 12 and 13 which are mounted, as by welding, to and rise vertically from base plate 10. Base plate 10 is provided with an access hole 14 about which are symetrically located a plurality of bolt holes 15 for mounting power takeoff unit 4 to plate 10 as by bolts, not shown.

A further plurality of holes 16 are located symetrically about access hole 14 outwardly of holes 15 for mounting housing 6 to a source of power, such as a truck transmission. Upon mounting housing 6 to a transmission, an input gear in the power takeoff unit will be coupled to a driving gear in the transmission through access hole 14 in a well known manner. The spacing and size of holes 16 are chosen to be standard such that assembly 1 may be readily mounted to any of several conventional truck transmissions such as the well known Spicer and Fuller transmissions which use a conventional eight hole pattern. For clearance to reach the bolts in any of holes 15 and 16, there are further provided a plurality of clearance holes 20, 21 and 22 in each of walls 11, 12 and 16 respectively.

On the right end of housing 6 as shown in FIGS. 2 and 3, there are further provided a plurality of flanges 25, 26 and 27 which extend inwardly from walls 12 and 13, respectively. Flanges 25, 26 and 27 are each provided at their upper end with a bolt hole 28, 29 and 30, respectively. Bolt holes 28, 29 and 30 are sized and positioned to mate with corresponding holes and flanges on alternator 2 for mounting alternator 2 to housing 6 in a cantilever fashion. Housing 6 is further provided with a plate 31 which extends at an angle from near the upper end of wall 12 interiorly of flange 25 to base plate 10. Flanges 25, 26 and 27 and plate 31 serve to provide mechanical strength for that portion of housing 6 to prevent outward deflection of walls 12 and 13 under the weight of alternator 2 and the extreme vibrational forces which are generated in transmissions in operation. For purposes of aligning assembly 1 during installation a pair of aligning pins 35 and 36 are provided on the longitudinal axis of access hole 14 near the edges of base plate 10. Pins 35 and 36 correspond in size and location to corresponding holes in conventional transmissions and serve to insure alignment between the power takeoff unit input gear and a driving gear in the transmission.

Figure 4:
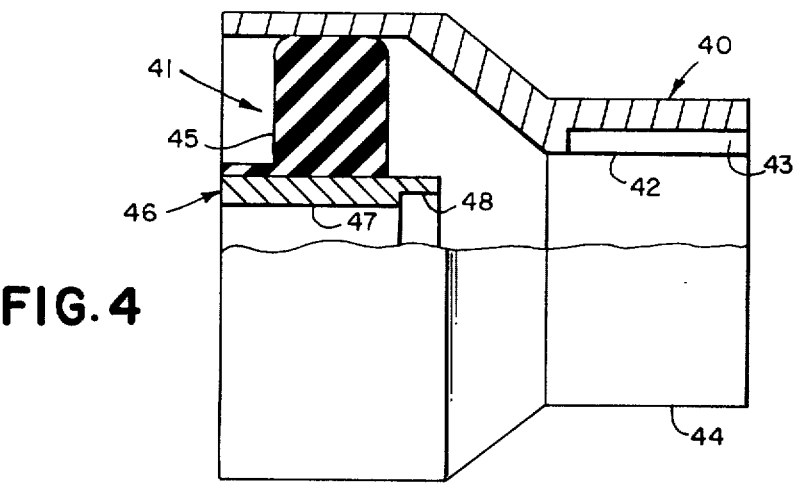
FIG. 4 is an elevation view in partial cross-section of the flexible dynamic coupling of the assembly of FIG. 1.
Figure 5:
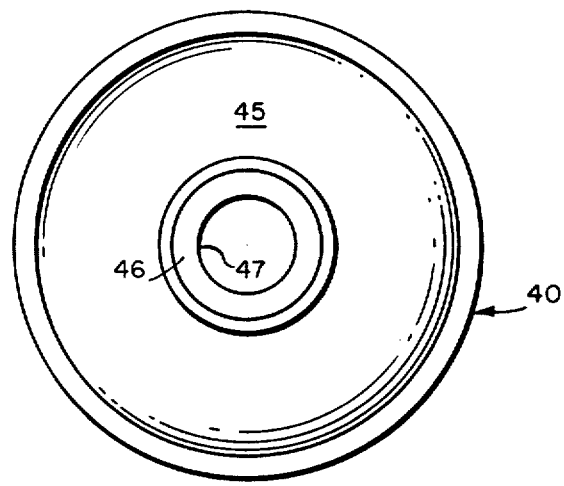
FIG. 5 is a left end view of the coupling of FIG. 4.
Figure 6:
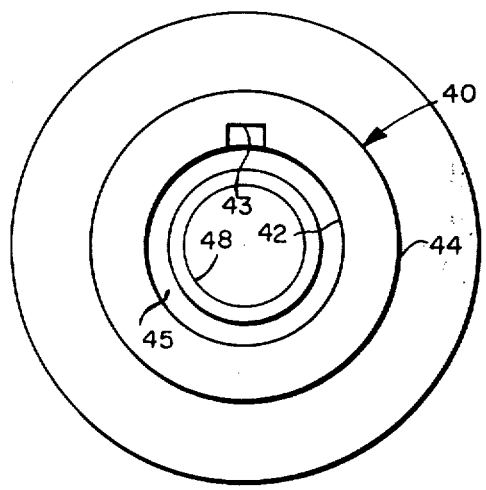
FIG. 6 is a right end view of the coupling of FIG. 4.

Power takeoff unit 4 is coupled to alternator 2 by means of the flexible dynamic coupling 7 and mounted to base plate 10 by bolts in holes 15. As shown in detail in FIGS. 4, 5 and 6, coupling 7 comprises a housing 40. Housing 40 is generally cylindrical in shape in a transverse cross-section and somewhat conically shaped in a longitudinal cross-section. A portion 41 of reduced cross-section is provided with a bore hole 42 for receiving the output shaft 5 of power takeoff unit 4. Bore hole 42 is further provided with a key way or slot 43 for receiving a key, not shown, which corresponds to a key-way or slot in shaft 5 for coupling shaft 5 to coupling 7. Interior of housing 40, there is provided a resilient member 41. Resilient member 41 typically comprises an annular rubber member 45 coaxially mounted on a metallic sleeve 46. Sleeve 46 is provided with a bore 47 for receiving shaft 3 of alternator 2. Sleeve 46 is further provided with section 48 of enlarged diameter for receiving a nut on the end of shaft 3 by means of which member 41 is fixedly attached to shaft 3.

The contact which member 41 makes with housing 40 is a friction fit. Under normal working conditions of typically 7.0 ft. lbs. of torque, there will be no slippage between member 41 and housing 40. Under conditions of mechanical seizure of either power takeoff unit 4 of alternator 2, however, a slippage will occur as the differential torque approaches 50 ft. lbs. In addition to providing slippage under certain conditions, rubber member 41 is also sufficiently resilient to permit a degree of flexing should there be or develop in use any small misalignment between shafts 3 and 5. Most importantly, the slippage and resiliency of member 41 together with the rigidity provided by housing 6 serves to significantly reduce the side loads on shaft 3 of alternator 2 to prevent premature forward bearing failure of the latter.

In a typical embodiment, housing 6 is approximately 15.5 inches long and 9.275 inches wide. The base and walls may be of steel or aluminum and are typically 0.275 inches thick. A cutout 17 as seen in FIG. 1 is provided for clearance as is required in mounting assembly 1 to several different types of commercially available transmissions. A typical electrical energy source is a Delco Remy 25-SI alternator manufactured by Delco Remy, a division of General Motors. The power takeoff unit 4 may be, for example, a Tulsa Series 24 P.T.O. manufactured by Tulsa, Inc. Tulsa, OK. The resilient member 41 is typically the interior part of the well known Dynaflex coupling manufactured by Lord Manufacturing Co., Erie, Pa. and adapted for use in the assembly of the present invention.

It is to be understood, however, that other units may be used in the assembly of the present invention as the assembly is especially adapted for use with a number of commercially available alternators and power takeoff units.

Accordingly, these and other modifications of the present invention as illustrated herein will be apparent to one skilled in the art without departing from the scope thereof as hereinafter claimed.

I claim:

1. An assembly for producing electrical energy in an automotive vehicle having a transmission comprising:
    a source of electrical energy having an armature shaft;
    a gear assembly having an input shaft and an output shaft;
    a means for frictionally coupling said armature shaft of said energy source and said output shaft of said gear assembly, said coupling means having a first means coupled to said armature shaft and a second means coupled to said output shaft, said first and said second means having facing surfaces which slip relative to each other for permitting relative rotation betwen said armature shaft and said output shaft in response to a predetermined force; and
    a relatively rigid housing having a base portion with a substantially vertical flange portion attached thereto, said source mounted on said flange portion and said gear assembly mounted on said base portion, for receiving said source and said gear assembly, said housing including means for maintaining said armature shaft in substantial coaxial alignment with said output shaft, a means for mounting said housing to a transmission in a vehicle, and a means for coupling said input shaft of said gear assembly to said transmission.

2. An assembly according to claim 1 wherein one of said first and said second means in said coupling means includes a resilient member which cooperates with said means for maintaining said armature shaft in substantial coaxial alignment with said output shaft for preventing destructive sideloading of said armature shaft.

3. An assembly according to claim 2 wherein said source is an alternator and said gear assembly is a power-take-off unit.

4. An assembly according to claim 3 wherein said means for coupling said input shaft of said gear assembly to said transmission comprises an access hole in said housing for providing access to said input shaft.

* * * * *